United States Patent [19]
Fasino

[11] Patent Number: 5,463,979
[45] Date of Patent: Nov. 7, 1995

[54] ANIMAL-OPERATIVE, ANIMAL FEEDER

[76] Inventor: Victor Fasino, 62 Oneida Ave., Landing, N.J. 07850

[21] Appl. No.: 257,277

[22] Filed: Jun. 9, 1994

[51] Int. Cl.⁶ .................................................. A01K 5/00
[52] U.S. Cl. ........................................ 119/54; 119/52.2
[58] Field of Search ................... 119/52.2, 53.5, 119/54, 57.8, 57.91

[56] References Cited

U.S. PATENT DOCUMENTS

| | | | |
|---|---|---|---|
| 920,865 | 5/1909 | Hannibal | 119/54 |
| 3,083,687 | 4/1963 | Slaven | 119/52.2 |
| 4,770,125 | 9/1988 | Gold et al. | 119/53.5 |
| 5,255,631 | 10/1993 | Anderson | 119/52.2 |

*Primary Examiner*—Robert P. Swiatek
*Attorney, Agent, or Firm*—Bernard J. Murphy

[57] ABSTRACT

A windowed housing attracts an animal to feed confined with a feed reservoir, but a limb set across the window frustrates the animal's attempt to access the feed. Pawing or pulling at the obstructing limb rotates a rod which opens a feed gate to discharge the feed into an underlying feed chamber. An opening in the chamber gives the animal access to the discharged feed, but release of the limb, to access the chamber-received feed, allows the feed gate to close.

13 Claims, 2 Drawing Sheets

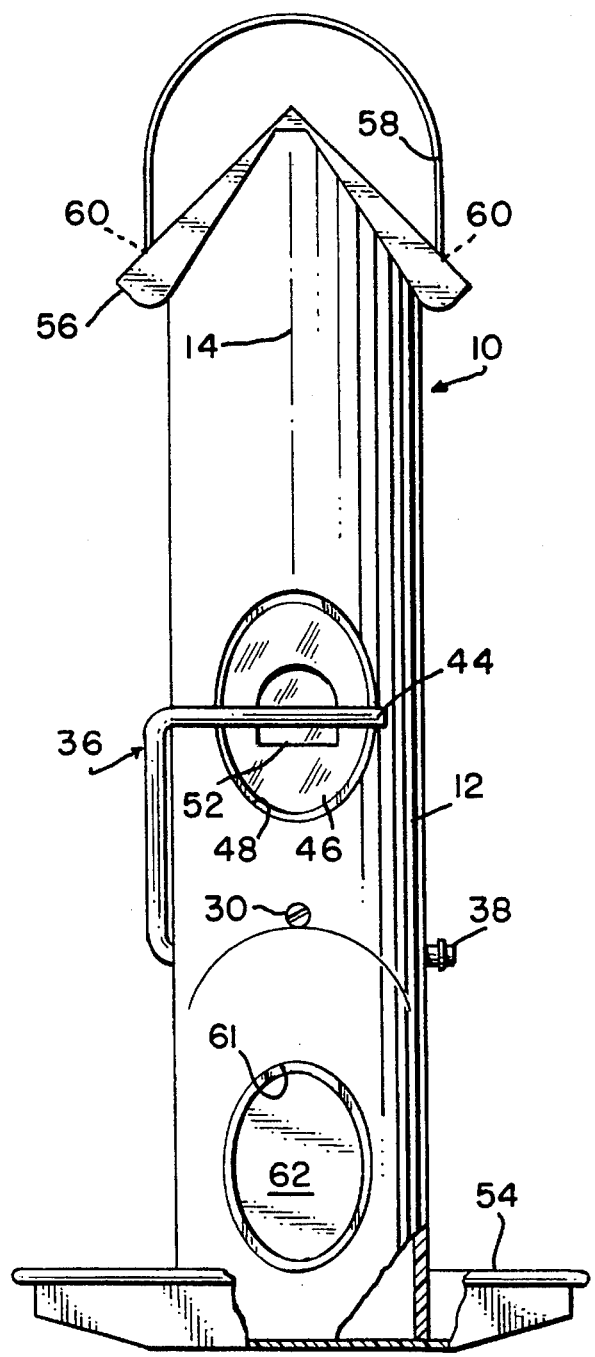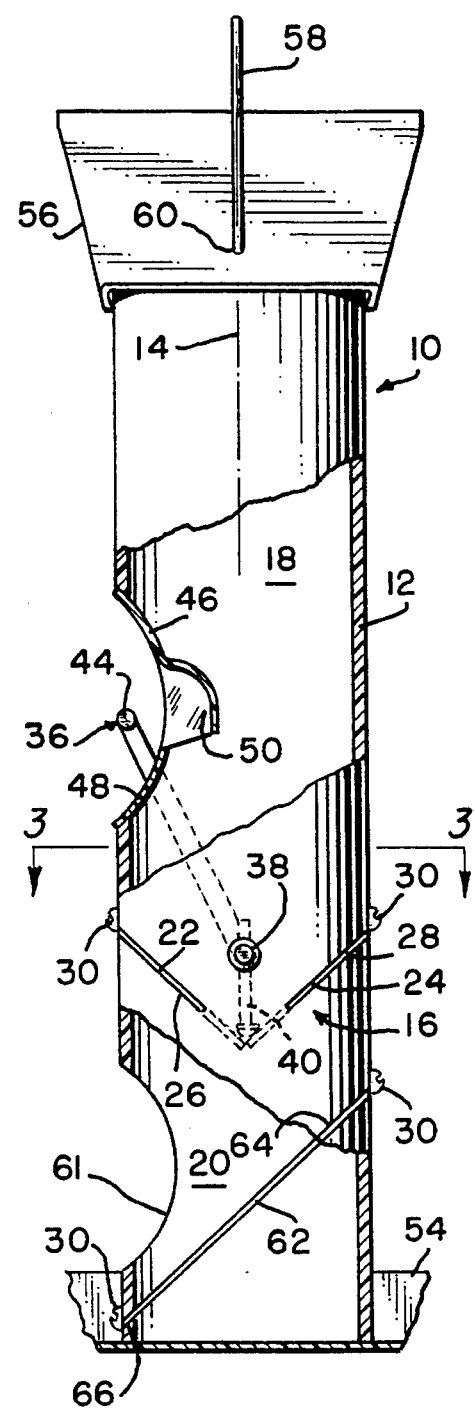

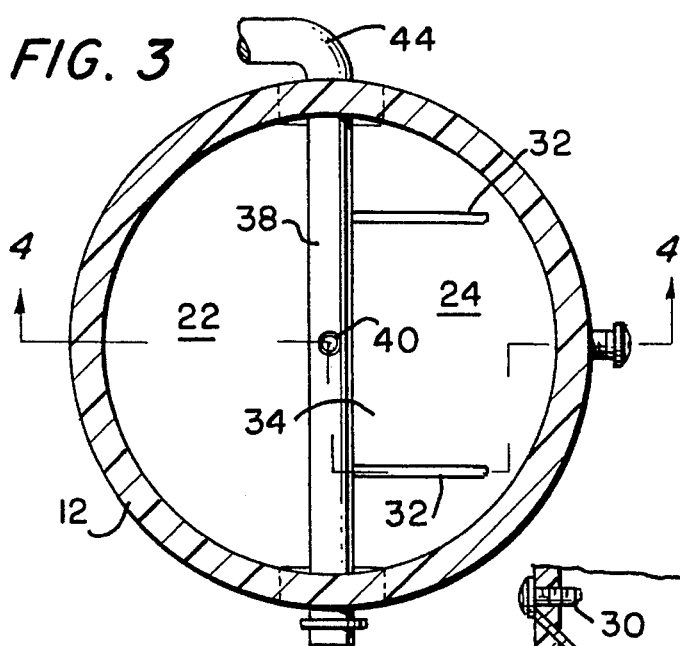
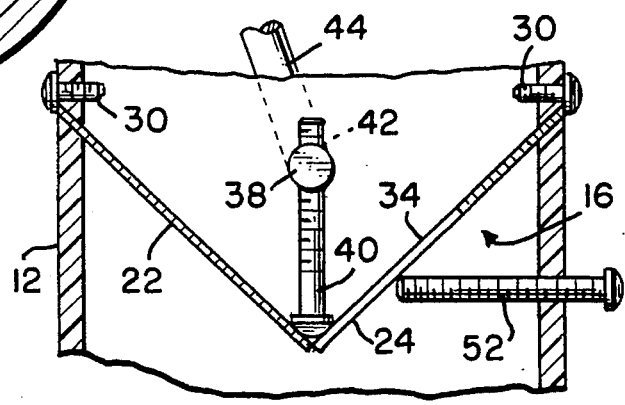
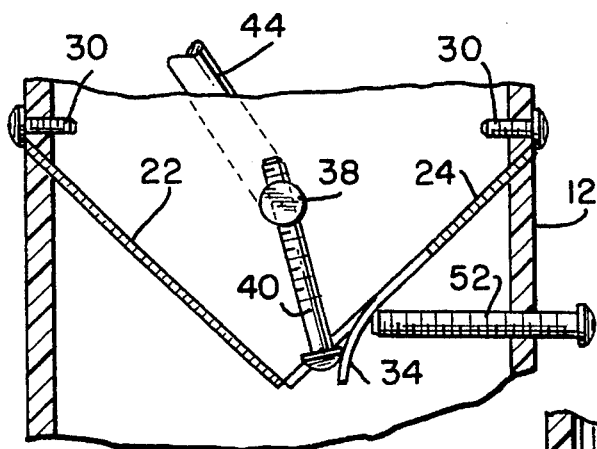
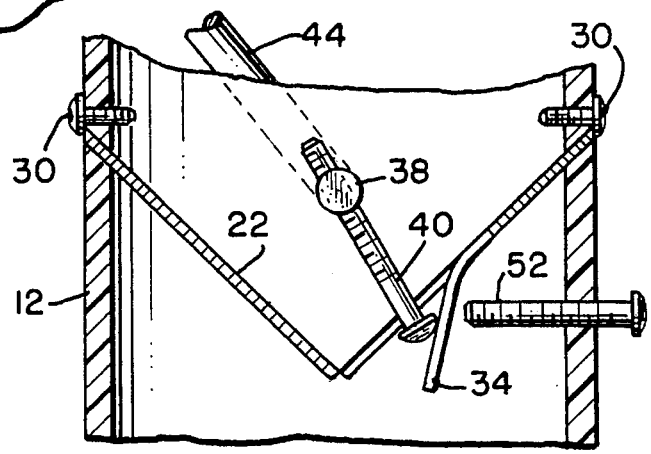

ANIMAL-OPERATIVE, ANIMAL FEEDER

This invention pertains to animal feeders, of the type which have a feed reservoir and an actuator of some sort which discharges feed from the reservoir into a feeding chamber, and in particular to such an animal feeder which is animal-operative in that it is so configured as to attract an animal to the feed and to cause the animal to operate the actuator to cause the feed to be released from the reservoir to a feeding chamber.

Animal feeders which have selective discharge of feed from a reservoir thereof to a feeding chamber, operated by actuator means, are well known in the prior art. However these are either manually-operated by an animal's human keeper, or time-controlled, and the like. Too, there are animal feeders, animal-operative, in which the animal, typically a canine or feline, operates an actuator, on having been taught the "trick" to discharge feed from a reservoir to an accessible feeding chamber or zone. It is an object of this invention, however, to set forth an animal-operative, animal feeder in which the feed is visually displayed to the animal, to cause the animal to grope for the displayed feed, the groping being unsuccessful in giving the animal access to the visible feed, but resulting in operation of an actuator which, in turn, causes the feed to be released to a feeding chamber remote from where the animal visually observed the feed.

Particularly, it is an object of this invention to disclose an animal-operative, animal feeder, comprising a housing; and first means, within said housing, for subdividing said housing into a feed reservoir and a feeding chamber; wherein said first means comprises gating means operative for opening said reservoir onto, and for closing off said reservoir from, said feeding chamber; actuator means, housing mounted, for operating said gating means to cause said gating means to open said reservoir onto said feeding chamber; and window means, fixed in said housing, for visually exposing an interior of said reservoir; wherein said actuator means comprises a limb, external of said housing, disposed in adjacency to, and in transverse of said window means.

Further objects of this invention, as well as the novel features thereof, will become apparent by reference to the following description, taken in conjunction with the accompanying figures, in which:

FIG. 1 is a vertical illustration of the front of the novel feeder, a portion of the bottom tray having been cut away;

FIG. 2 is a side, elevational view of the feeder, taken from the right-hand side of FIG. 1, and is partially cross-sectioned;

FIG. 3 is a cross-sectional view taken along section 3—3 of FIG. 2;

FIG. 4 is a cross-sectional view taken along section 4—4 of FIG. 3, showing the gate closed off, and an adjustment screw engaged with the gate;

FIG. 5 is a view like that of FIG. 4 in which, however, the gate is accommodated for a minimal opening; and FIG. 6 is another view like that of FIGS. 4 and 5 in which, now, the gate is free to open fully.

As shown in the figures, the novel feeder 10 comprises a cylindrical housing 12 having a longitudinal axis 14. Intermediate the length of the housing 12 there is disposed a trough 16. Trough 16 subdivides the housing into a feed reservoir 18 thereabove, and a feeding chamber 20 therebelow. The trough 16 is formed of two, substantially semicircular plates 22 and 24 of spring tempered steel. Slots 26 and 28, formed in the housing 12, accommodate the plates 22 and 24 therein, and screws 30 retain them in position by means of the drive heads thereof.

As can be seen best in FIG. 3, plate 24 has a pair of parallel slots 32 formed therein to define, therebetween, a gate 34. The feeder 10 has an actuator 36 operative for displacing the gate 34 to allow feed in the reservoir 18 to discharge into the chamber 20. The actuator 36 comprises a bar 38 rotatably mounted in transverse of the housing 12, and a rod 40 which depends from the bar 38. In this embodiment of the invention, the rod 40 comprises a machine screw which is threadedly engaged with a tapped hole 42 provided therefor in the 38. Contiguous with the bar 38 is a limb 44 of a substantially right-angular conformation. The housing 12 has a window 46 which is fixed in a scalloped opening 48 provided therefor. The remote end of the limb is disposed in adjacency to, and transversely of the window 46. The window 46 is exactly that, a transparent plastic element, but it has an inwardly-extending cove 50 which is open at the bottom 52. Consequently, upon an animal mounting the feeder 12, the feed within the reservoir 18 is clearly seen, it can be scented through the open bottom 52 of the cove 50, but is obstructed from direct access by the end of limb 44. As a consequence, the animal, for instance, a squirrel, will pull at the obstructing limb 44 in an attempt to remove the latter from obstruction. As a result, the limb 44 will be drawn slightly away from the housing 12, causing the bar 38 to rotate, and the rotation of bar 38 causes the rod 40 to displace the gate 34. In the circumstances, feed will discharge through the thus opened gate 34, and enter the feeding chamber 20. As the animal sees the discharged feed, it descends along the housing 12 to partake of the same. Upon release of the obstructing limb 44, the spring steel gate 34 returns to its normal, closed disposition, and no further feed is released from the reservoir 18. However, should the animal, a squirrel or whatever, continue to hold the limb 44 forward, the supply of fee will be self-limiting. That is, the feed has a natural tendency to stack at the narrow opening at gate 34, and the discharge thereof stops. When the limb 44 is released, the closing motion of the gate 34 rearranges the stacked feed, making discharge thereof possible again by a subsequent pull on the limb 44 to effect a reopening of the gate 34.

FIG. 4 shows the gate 34 in a closed disposition, with the rod 40 in a vertical attitude. FIG. 5 shows the gate 34 partially opened, the opening thereof being delimited by an adjustment screw 52 which is in penetration of the housing 12. As will be evident, the screw can be threadedly advanced into the housing interior to engage the gate 34 and restrict the opening thereof. As shown in FIG. 5, the screw 52 is preventing substantially half of the gate 34 from deflection. FIG. 6 shows the screw 52 withdrawn from contact with the gate 34; therefore, the gate 34 is fully responsive to the rod 40 and opens fully, therefore, the amount of seed or feed dispensed is controllable .

Fixed to the bottom of the housing 12 is a tray 54 on which to support an animal, as well as for receiving any spilled feed from the feeding chamber 20. Hardware (not shown) secures the tray 54 in place. At the opposite axial end of the housing 12 is a pitched roof 56. The latter protects the reservoir 18 from the elements. A hanger or bail 58, having hooked ends (not shown) which engage pivot holes provided therefor (not shown) in the end of the housing 12 keeps the roof 56 captive to the feeder 10. Holes 60 formed in the roof 56 permit the latter to slide up upon the bail 58, so that the reservoir 18 can be exposed for charging with feed.

Feed discharged from the reservoir 18, and entering the feeding chamber 20 is accessible to the animal through a cut-out 60 formed in the housing 12 in adjacency to the bottom thereof. Cut-out 60 is a scalloped opening, but an opening formed upwardly from the bottom of the housing 12 could serve just as well. As described thus far, it will be evident that discharged feed will drop to the center of the feeding chamber 20. Now, some animals are reluctant to insert their heads into a somewhat closed space. For this reason, the invention comprehends means for directing the discharged feed toward the cut-out 60. The aforesaid means comprises a diagonally-disposed plate 62 set in slots 64 and 66 provided therefor in the housing 12. Slot 64 is shown in FIG. 2, whereas slot 66 is not.

The invention provides for the dispensing of corn kernels, cracked corn, shelled peanuts, sunflower seeds or the like. Too, the feeder 10 can be used by any animal or large bird capable of applying approximately a one and half pound pull on the obstructing limb 44, as that is all the force required to operate the feeder 10 according to an embodiment thereof constructed as described herein.

While I have described my invention in connection with a specific embodiment thereof, it is to be clearly understood that this is done only by way of example, and not as a limitation to the scope of the invention, as set forth in the objects thereof, and in the appended claims. For instance, the gate 34 is deflected and returns to its normal closure, due to the fact that it is formed of spring steel. In lieu thereof, others may find it useful to use a pivotable gate which is held in closure by a biasing spring. Too, the housing is, shown to be of cylindrical form. This is arbitrary, and the principle of the invention can be employed in housings of other configurations. Consequently, all such modifications and/or alterations of the concept are deemed to be within the ambit of my invention, and embraced by the appended claims.

I claim:

1. An animal-operative, animal feeder, comprising:

a housing; and first means, within said housing, for subdividing said housing into a feed reservoir and a feeding chamber; wherein said first means comprises gating means operative for opening said reservoir directly onto, and for closing off said reservoir from, said feeding chamber;

actuator means, housing mounted, for operating said gating means to cause said gating means to open said reservoir directly onto said feeding chamber; and window means, fixed in said housing, for visually exposing an interior of said reservoir; wherein said actuator means comprises a limb, external of said housing, disposed in adjacency to, and in transversely of said window means.

2. An animal-operative, animal feeder, according to claim 1, wherein:

said first means comprises a trough; and said gating means comprises a displaceable portion of said trough.

3. An animal-operative, animal feeder, according to claim 2, wherein:

said actuator means further comprises a bar rotatably mounted transversely of said housing; and said bar has means for contacting and displacing said trough portion.

4. An animal-operative, animal feeder, according to claim 2, wherein:

said trough, including said displaceable portion thereof, is formed of spring tempered steel.

5. An animal-operative, animal feeder, according to claim 1, further including:

means adjustably mounted in said housing for selectively delimiting operation of said gating means.

6. An animal-operative, animal feeder, according to claim 1, wherein:

said housing has a longitudinal axis;

said housing is open at one axial end thereof to accommodate filling of said reservoir with feed.

7. An animal-operative, animal feeder, according to claim 6, wherein:

said opposite axial end of said housing is also open; and a tray is coupled to said opposite axial end of said housing.

8. An animal-operative, animal feeder, according to claim 7, wherein:

said housing has a cut-out formed therein, in adjacency to said opposite axial end thereof, to define a feed port thereof.

9. An animal-operative, animal feeder, according to claim 8, further including:

means within said housing for directing feed toward said cut-out.

10. An animal-operative, animal feeder, according to claim 6, further including:

means for covering said one axial end of said housing to shield feed in said reservoir from the elements.

11. An animal-operative, animal feeder, according to claim 10, further including:

means coupled to said one axial end for suspending said housing in vertical disposition; and said suspending means comprises means for holding said covering means captive to said housing.

12. An animal-operative, animal feeder, comprising:

a housing; and first means, within said housing, for subdividing said housing into a feed reservoir and a feeding chamber; wherein said first means comprises gating means operative for opening said reservoir onto, and for closing off said reservoir from, said feeding chamber;

actuator means, housing mounted, for operating said gating means to cause said gating means to open said reservoir onto said feeding chamber; and window means, fixed in said housing, for visually exposing an interior of said reservoir; wherein said actuator means comprises a limb, external of said housing, disposed in adjacency to, and transversely of said window means;

said first means comprises a trough;

said gating means comprises a displaceable portion of said trough;

said actuator means further comprises a bar rotatably mounted transversely of said housing; and said bar has means for contacting and displacing said trough portion; and wherein said trough portion contacting and displacing means comprises a rod depending from said bar.

13. An animal-operative, animal feeder, comprising:

a housing; and first means, within said housing, for subdividing said housing into a feed reservoir and a feeding chamber; wherein said first means comprises gating means operative for opening said reservoir onto, and for closing off said reservoir from, said feeding chamber;

actuator means, housing mounted, for operating said gating means to cause said gating means to open said reservoir onto said feeding chamber; and window means, fixed in said housing, for visually exposing an interior of said reservoir;

said actuator means comprises a limb, external of said housing; disposed in adjacency to, and transversely of said window means; and further including means adjustably mounted in said housing for selectively delimiting operation of said gating means; and wherein said delimiting means comprises an adjusting screw in penetration of said housing and having an end disposed for engagement with, and for removal thereof from, said gating means.

* * * * *